United States Patent [19]

Johnson

[11] Patent Number: 4,712,769
[45] Date of Patent: Dec. 15, 1987

[54] HIGH TEMPERATURE BALANCED VALVE TRIM

[75] Inventor: Roger E. Johnson, Girard, Pa.

[73] Assignee: White Consolidated Industries, Inc., Cleveland, Ohio

[21] Appl. No.: 902,310

[22] Filed: Aug. 29, 1986

[51] Int. Cl.$^4$ .............................................. F16K 15/00
[52] U.S. Cl. ................................... 251/324; 251/189; 251/191; 277/116.2; 277/117
[58] Field of Search ..................... 137/454.6; 251/189, 251/191, 324; 277/116.2, 117, 118, 119, 120, 121, 122, 165, 206 R, 228

[56] References Cited

U.S. PATENT DOCUMENTS

| | | | |
|---|---|---|---|
| 2,919,887 | 1/1960 | Patterson | 251/189 |
| 3,586,042 | 6/1971 | Grenier | 251/191 X |
| 3,612,479 | 10/1971 | Smith | 251/189 X |
| 3,711,062 | 1/1973 | Kirkwood | 251/172 |
| 4,315,616 | 2/1982 | Welker | 251/191 X |
| 4,566,703 | 1/1986 | Zitting | 277/165 |

*Primary Examiner*—Harold W. Weakley
*Attorney, Agent, or Firm*—Schweitzer & Cornman

[57] ABSTRACT

The disclosure is directed to a seal forming means in a valve plug for use in a fluid control valve, particularly in high temperature and high pressure fluid applications. The valve plug of the invention generally comprises a main valve plug member and a seal forming member associated therewith. The seal forming member is axially aligned with the main valve plug member and includes an outer wall having a surface that is coincident with an imaginary surface extension of the outer surface of the main valve plug. The seal forming member comprises a durable material having predetermined resilient characteristics, whereby said seal forming member is resiliently compressible within a predetermined range of compression. Moreover, the seal forming member includes an interior space and a finite section of minimum wall thickness formed in the outer wall. A packing material is tightly received and compressed within said interior space and, means are provided for compressing the seal forming member upon valve shut off. In this manner, the seal forming member is resiliently compressed within its predetermined range of compression to thereby compress and urge the packing material toward the finite section of minimum wall thickness of the outer wall. Upon a predetermined amount of compression, the packing material will exert a pressure sufficient to resiliently deform the outer wall into an outwardly extending bulge formation, which bulge formation is arranged to contact the control valve to thereby form a leak tight seal around the valve plug.

11 Claims, 5 Drawing Figures

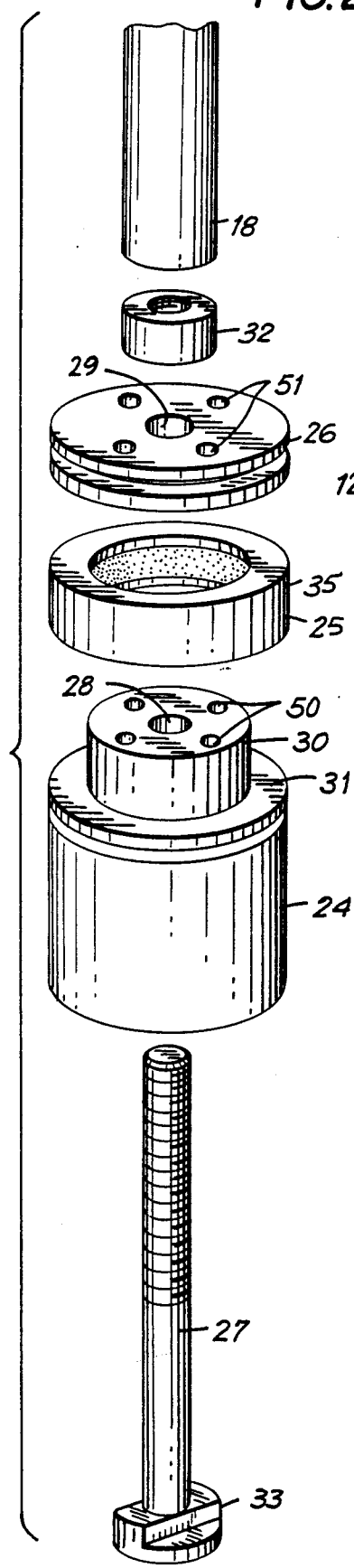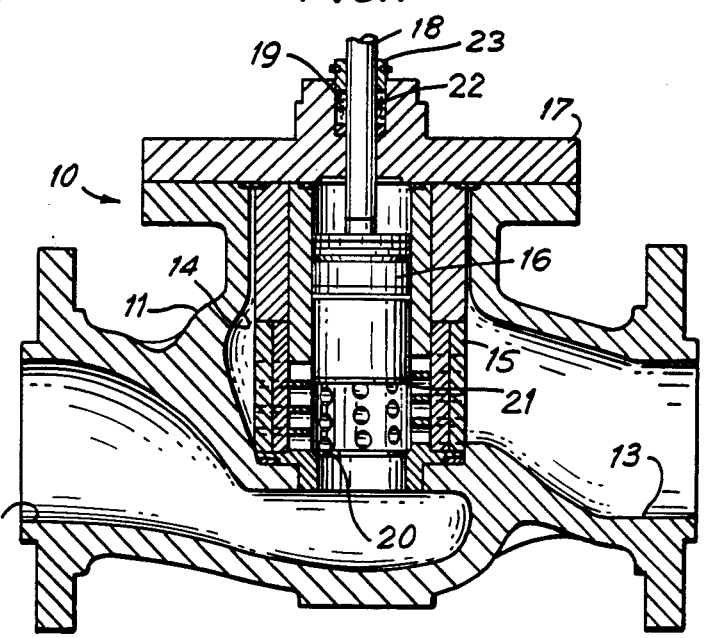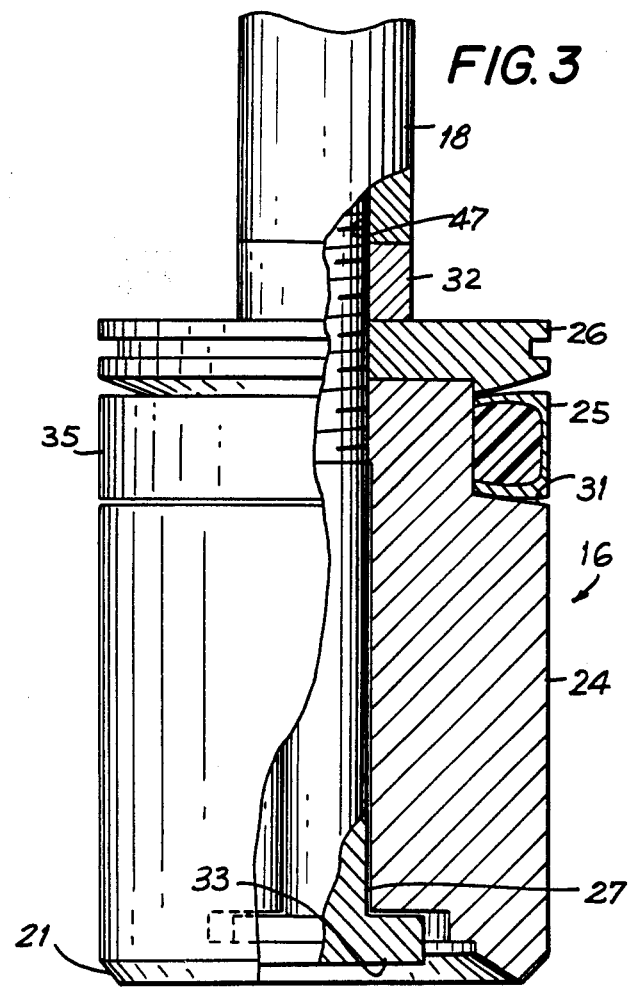

HIGH TEMPERATURE BALANCED VALVE TRIM

BACKGROUND AND SUMMARY OF THE INVENTION

The present invention is directed to a high pressure, high temperature control valve and, more particularly, to a new and improved seal arrangement for the valve plug.

Typically, in a high pressure, high temperature control valve, a valve plug is arranged for controlled axial movement within a valve housing through a work stroke between full open and full closed positions. In the full closed position, the plug mates in a leak tight relation with a valve seat formed in the valve housing whereby the plug interrupts and closes all fluid flow through the valve. The valve plug-valve seat mate is designed to form the primary leak tight fluid flow shut off. However, during shut off, the high upstream fluid pressure may cause fluid leakage around the plug. This is especially true inasmuch as the plug must be slidably received within the valve housing and inherently cannot be in such a snug fit so as to prevent leakage.

Fluid leakage around the plug is highly undesirable in that the critical function of the valve is to control the high pressure and sometimes high temperature fluid flow. Any leakage around the plug will denigrate from the integrity of the valve shut off by allowing some fluid to, in effect, bypass the primary plug-seat seal. Indeed, leakage around the plug will detract from efficient valve operation since high pressure leakage from around the upper portion of the plug may escape from the valve housing or generally flow uncontrolled, to the valve outlet. This could result in a noisy valve operation and, in time, damage the valve as well as the system in which the valve has been installed.

Accordingly, the prior art has proposed numerous seal arrangements to prevent fluid leakage from around the valve plug. A typical prior proposal consists of the use of annular seal rings mounted in circumferential grooves formed in the valve plug. The rings are dimensioned to be in a snug fit between the plug and valve housing to form a seal barrier to fluid flow. While the seal rings are somewhat effective, the snug fit does not provide a leak tight seal and a greater than snug fit cannot be utilized inasmuch as the plug must be movable relative to the valve housing. Indeed, the snug fit between the seal ring and valve housing increases the amount of force required to displace the valve plug thereby decreasing the ease of operation of the valve. In addition, friction wear caused by valve plug movement eventually lessens the sealing effectiveness of the rings necessitating periodic replacement of the rings.

A somewhat more effective prior art proposal comprises the use of a two member valve plug wherein the two members are axially movable relative to one another and hold a generally conventional packing element therebetween. The packing element is in a snug fit with the valve housing for all axial positions of the plug except at valve shut off. When the plug mates with the valve seat, the two plug members are moved closer to one another to thereby compress the packing element. The compression of the packing element causes it to expand into a leak tight seal with the valve housing. Accordingly, this proposal provides a leak tight seal around the valve plug while accommodating smooth plug movement since the leak tight seal is formed only when the plug is seated against the valve seat and the two members are thereafter moved to compress the packing element. Upon valve opening, the two members are displaced to be further apart from one another thereby releasing the compression on the packing element. The packing element may then retract to its normal snug fit to greatly reduce the friction between the plug and housing. An example of such a two member plug is disclosed in U.S. Pat. No. 4,274,433. While the prior proposal of the type disclosed in U.S. Pat. No. 4,274,433 is innovative, the conventional packing material is directly exposed to fluid flow and, therefore, is gradually worn down by the effects of the fluid, especially in high pressure, high temperature fluid applications.

It is a primary objective of the present invention to provide a new and improved seal arrangement for a valve plug which incorporates the advantages of the seal disclosed in U.S. Pat. No. 4,274,433 while providing a means for forming a more effective, wear resistant and long work life seal. Generally, the invention teaches a multi-component valve plug comprising a main valve plug, a seal forming member made from a durable material having some resilient characteristics, such as stainless steel and a top compressing element. The three components are arranged in a close, axially stacked relation and are secured together, as for example, by a threaded rod-like element-nut arrangement which permits some longitudinal play between the components under pressure. Such pressure may be applied to the valve plug upon seating against the valve seat to cause the seal forming member to assume a leak tight seal configuration, as will appear.

In accordance with an important principle of the invention, the seal forming member comprises a hollow doughnut-shaped element made from a durable material having some resilient characteristics and including a cylindrical outer wall and two annular wall sections extending radially inward from the top and bottom of the outer cylindrical wall. The cylindrical outer wall and two annular wall sections are formed relative to one another such that the internal cross-section of the hollow seal forming member is a generally U-shaped cross-section. In the manufacture of the durable seal forming member, a packing material is inserted and tightly compressed into the hollow interior defined by the outer wall and two annular wall sections of the seal forming member to thereby completely fill such interior space. The innermost diameters of the wall sections are then crimped toward one another to further compress and urge the packing material toward and against the U-shaped internal cross-section formed between the outer wall and two annular wall sections.

Pursuant to the preferred embodiment of the invention, the seal forming member is seated atop the main valve plug whereby the outer cylindrical wall of the seal forming member forms a flush and smooth continuation of the outer surface of the main valve plug which is in a sliding contact with the valve housing. In the operation of the valve, the compressing element is mounted above the seal forming member and is urged to apply a downward pressure on the seal forming member upon the seating of the main valve plug on the valve seat. This downward pressure, together with the longitudinal play between the compressing element, seal forming member and main valve plug, causes the seal forming member to be compressed and squeezed between the compressing element and seated main valve plug.

In accordance with the invention, the confronting surfaces of the axially stacked components of the valve plug are arranged and configured relative to one another whereby the compressive forces developed by the compressing element and main valve plug tend to further crimp the annular wall sections at their innermost diameters to further urge the tightly compressed packing material into the U-shaped cross-section of the seal forming member. It has been found that a practicable amount of pressure applied to the seal forming member causes the packing material to exert an outward pressure sufficient to deform the durable but somewhat resilient seal forming member at the area of minimum wall thickness of the cylindrical outer wall. More specifically, the outer cylindrical wall deforms into a bulge that extends outwardly from the area of minimum thickness into sealing contact with the valve housing. Significantly, the bulge will form a leak tight seal between the valve plug and valve housing. Moreover, upon removal of the compressive pressure, the resilient characteristics of the seal forming member permit the bulge to retract such that the outer cylindrical wall of the member resumes the characteristic of a smooth, flush continuation of the main valve plug to permit ease of valve plug movement.

Pursuant to a more specific feature of the preferred embodiment of the invention, the internal cross-section of the seal forming member is formed to a truncated U-shape formed by spherical surfaces of equal radii between each of the annular wall sections and the cylindrical outer wall separated by a straightlined section of the outer wall. The straightlined section is positioned midway between the two annular wall sections and therefore forms the section of minimum thickness. Empirical testing of prototypes of the invention have shown truncated U-shaped configuration to result in the most effective bulge seal formation and retraction back to a smooth surface.

In accordance with another feature of the preferred embodiment, the surfaces of the compressing element and main valve plug which confront the seal forming member are oriented in asymmetrical angles relative to one another whereby the further crimping of the inner diameters of the annular wall sections results in an asymmetrical application of pressure on the packing material to displace the formation of the bulge to a location closer to the top of the seal forming member. This orientation of the bulge to a position which is off center and closer to the top of the seal forming member has been found to improve the tightness of the seal in that the crimping forces of the compressing element are transmitted more directly and with greater concentration to the bulge. Moreover, the asymmetrical pressure application tends to increase the compression between the confronting surfaces of the seal forming member and main valve plug to form an additional sealing barrier to fluid flow, as will be described in greater detail hereinbelow.

The present invention therefore provides a highly effective, leaktight seal between the valve plug and valve housing in a manner that accommodates smooth valve plug movement. The seal is formed only after the plug is seated and retracts to a smooth surface, offering minimal friction during the time the valve plug is moving to facilitate ease of plug movement and to virtually eliminate friction wear on the seal. In addition, the bulge forms an extremely tight fit between the plug and valve housing for a maximum sealing effectiveness that is not diminished by friction wear, as discussed above. The amount of actual deformation of the seal forming member required to form the leak tight seal is minimal and well within the resliency range of such durable materials as stainless steel, teflon, and plastic-type materials. Thus, a stainless steel seal forming member may be utilized in a stainless steel valve housing to provide a very secure, leak tight, durable and minimal friction wear, metal to metal seal which may be as effective as the seal formed at the valve plug and valve seat during valve shut off.

For a better understanding of the above and other features and advantages of the present invention, reference should be made to the following detailed description of a preferred embodiment of the invention and to the accompanying drawings.

BRIEF DESCRIPTION OF THE DRAWINGS

FIG. 1 is a side cross-sectional view of a high pressure control valve incorporating the valve plug of the present invention.

FIG. 2 is an exploded, perspective view of the components of a valve plug built in accordance with the teachings of the present invention.

FIG. 3 is a side view, partly in cross-section, of the valve plug illustrated in FIG. 2, after assembly of the components.

DETAILED DESCRIPTION OF A PREFERRED EMBODIMENT OF THE INVENTION

Figure 5:
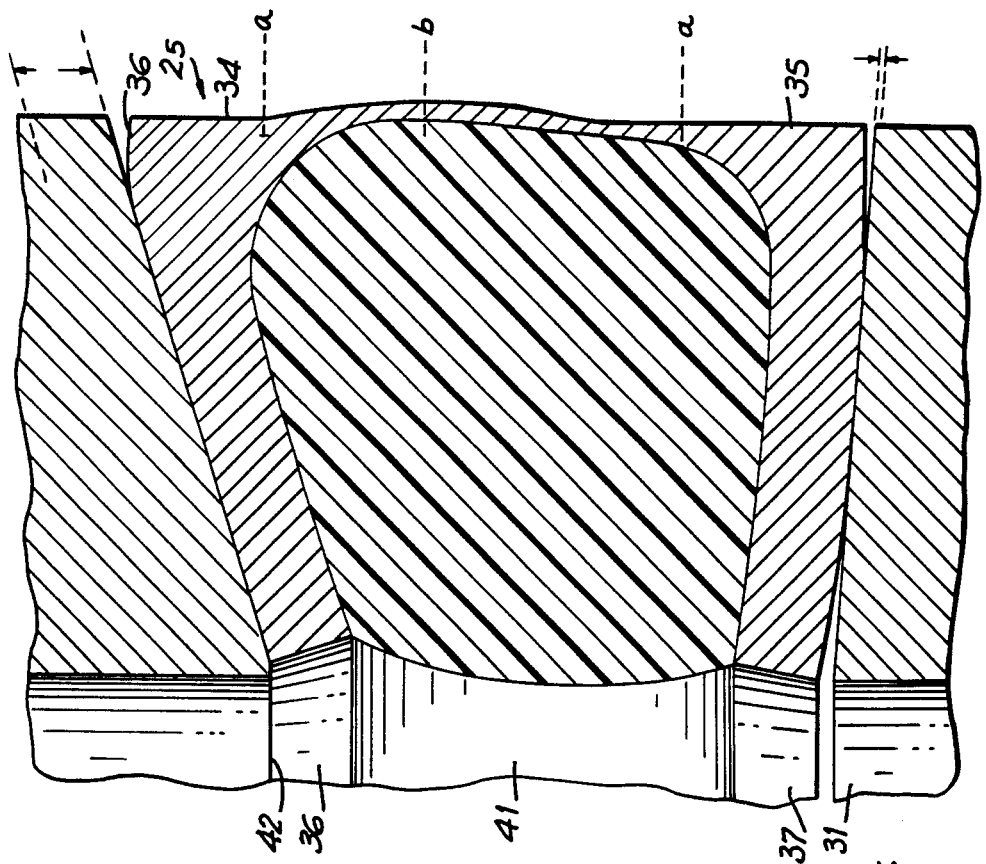
FIG. 4 and 5 illustrate in cross-section enlarged and exaggerated side views of the seal forming member of the valve plug of the invention before and after compression upon valve shut off, respectively.

Referring now the drawings and initially to FIG. 1, there is illustrated a high temperature, high pressure fluid control valve generally indicated by the reference numeral 10. The valve 10 comprises a valve housing 11 including a fluid inlet passage 12 and a fluid outlet passage 13 interconnected by a web portion 14. High pressure fluid may flow from the inlet passage 12, through the web portion 14 and out the outlet passage 13. Mounted within the web portion 14 is a fluid flow restrictor means 15. To advantage, the fluid flow restrictor means 15 may be of the type illustrated and described in U.S. Pat. No. 4,249,574, which is hereby expressly incorporated by reference. The fluid flow restrictor means 15 will act to controllably dissipate the kinetic energy of the high pressure fluid flow as it flows through the web portion 14 of the valve housing 11 from the inlet passage 12 to the outlet passage 13. A bonnet 17 is mounted onto the valve housing 11 in a leak tight relation to close and seal off the web portion 14.

Slidably received within the fluid flow restrictor means 15 is a valve plug 16 which is connected to a valve stem 18, as will be described. The valve stem 18 extends through an opening 19 formed in the valve bonnet 17 to an actuator (not specifically illustrated) whereby the valve stem 18 may be moved by the actuator to controllably lift and lower the valve plug 16 from an uppermost full open position to a lowermost valve shut off position, as is well known in the art. FIG. 1 illustrates the valve plug 16 in an approximately ¾ open position. Packing means 22 is received within the opening 19 to surround the stem 18 and prevent leaking. A cap member 23 is utilized to compress the packing means 22 within the opening 19.

Formed within the fluid flow restrictor means 15 is a tapered valve seat 20 which is arranged to mate with a complementary tapered, valve seat engaging surface 21 provided at the lowermost end of the valve plug 16. When the valve plug 16 is at its lowermost, valve shut off position, the surface 21 mates with the valve seat 20 to form a metal to metal leak tight seal. Accordingly, fluid is prevented from flowing from the inlet 12 end through the restrictor 15 into the outlet 13. However, as will appear, the high fluid pressure in the inlet 12 will tend to cause fluid seepage from balancing flow paths 50,51 formed through the plug 16 (to be described below) and around the exterior of the plug 16. Unimpeded, the fluid seepage may reach the restrictor 15 and flow out the fluid outlet 13; a highly undesirable circumstance, as discussed above. Hence, there is a need to form a leak tight seal around the plug 16 so as to prevent any fluid seepage from flowing past the plug 16.

Referring now to FIG. 2, there is illustrated an exploded, perspective view of the multi-component plug 16 of the invention including a highly effective seal forming means to form a leak tight seal between the plug 16 and the fluid flow restrictor 15. The plug 16 comprises a main valve plug 24, a seal forming member 25 and a compressing element 26. A threaded rod 27 is received through openings 28, 29 formed through each of the main valve plug 24 and compressing element 26, respectively, to mount the components 24, 25, 26 of the plug 16 in a close, axially stacked relation (see FIG. 3). When in the assembled, axial stack, the seal forming member 25 is received over an upwardly extending section of reduced diameter 30 of the main valve plug 24 and is seated against a top surface 31 of the main valve plug 24. A rounded nut 32 is screwed down the rod 27 onto the axial stack to secure the stacked components 24, 25, 26 in a tight relation between the nut 32 and a retaining stop 33 formed at the lower end of the threaded rod 27 (see FIG. 3). The tight fit caused by the nut 32 and stop 33 allows for some longitudinal play between the components 24, 25, 26 upon application of pressure to the valve plug 16 in the manner to be described (see FIGS. 3 and 4). A plurality of balancing flow paths 50, 51 are formed through each of the main valve plug 24 and compressing element 26, respectively. The flow paths 50 are aligned with the flow paths 51 when the components 24, 25, 26 are assembled into the stack whereby, to advantage, fluid may flow from the inlet 12 to above the valve plug 16. In this manner, the high pressure of the fluid flow will act equally upon both the top and bottom of the plug 16 to balance the plug and provide ease of valve operation. However, as should be understood, it is the high pressure fluid above the plug 16 which may cause seepage around the plug 16 and necessitates a leak tight seal around the valve plug 16 during valve shut off to prevent an uncontrolled fluid leakage into the fluid outlet 13.

Figure 4:
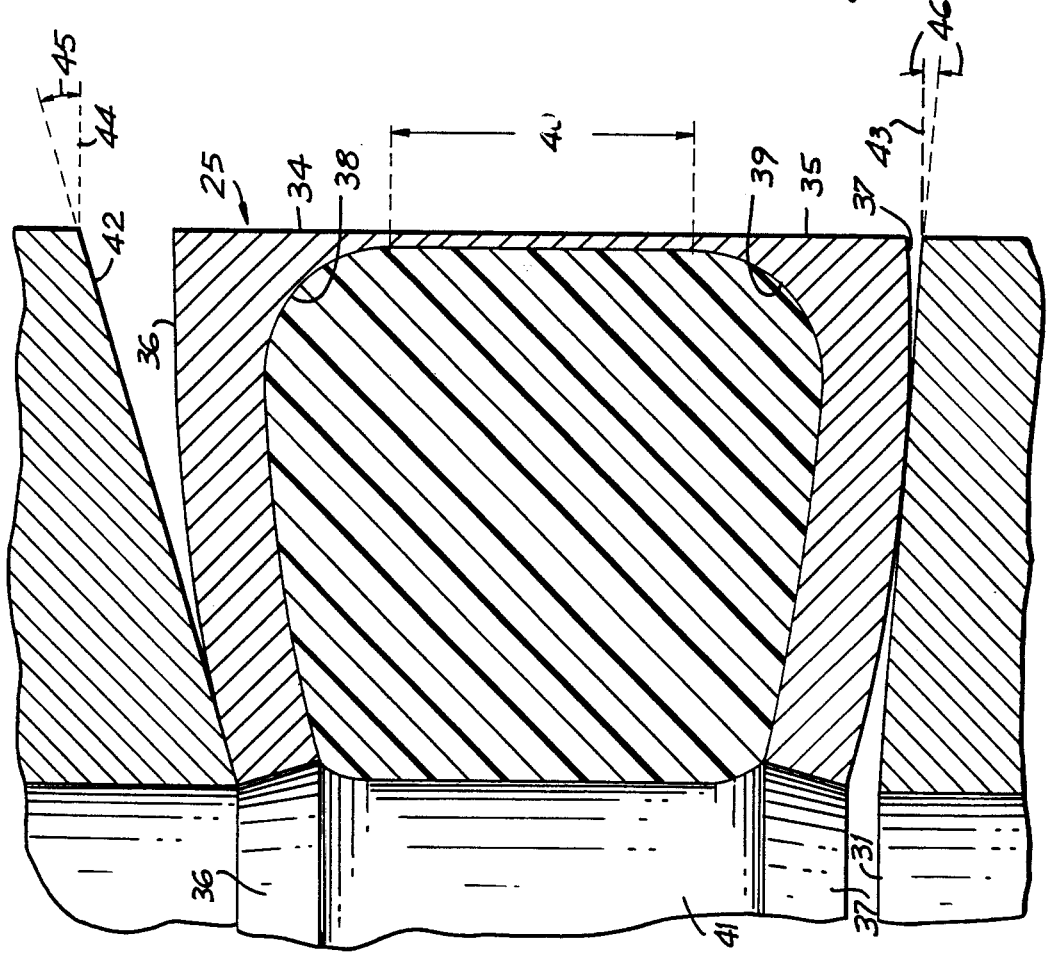

As clearly illustrated in FIGS. 3, 4 and 5, the seal forming member 25 comprises a hollow, doughnut-shaped element 34 including an outer cylindrical wall 35 integral with spaced, upper and lower, annular, radially inwardly extending wall sections 36, 37. In the preferred embodiment, the element 34 is made from stainless steel. However, other sturdy durable material having some resilient characteristics may be utilized to form the element 34. Spherical surfaces 38, 39 of equal radii are formed between each of the wall sections 36, 37 and the outer cylindrical wall 35. The spherical surfaces 38, 39 are separated by a straightlined section 40 of the outer cylindrical wall 35, which section 40 is equidistant from the top and bottom of the wall 35 and comprises the area of minimum thickness of the wall 35. During the manufacture of the seal forming member 25, a packing material 41, such as carbon graphite, is compressed into the hollow interior of the doughnut-shaped element 34. The innermost diameter of the wall sections 36, 37 are permanently crimped toward one another to further tightly compress and urge the packing material 41 toward the spherical surfaces 38, 39 and the straightlined section 40 (see FIG. 4).

Pursuant to a significant feature of the preferred embodiment of the invention, each of the top surface 31 of the main valve plug 24 and the bottom surface 42 of the compressing element 26 is in an angular orientation relative to a horizontal plane 43, 44 (plane 43 being parallel to plane 44). The angle of inclination 45 of the surface 42 is greater than the angle of inclination 46 of the surface 31 whereby, in the axial stack of components 24, 25, 26 as compressed between the nut 32 and stop 33, the surface 42 contacts the upper wall section 38 toward the innermost diameter of the crimped annular wall section 36 and the surface 31 is in generally continuous contact with the substantial length of the lower wall section 37 (see FIGS. 3 and 4).

Referring again to FIG. 3, the valve stem 18 is provided with an internal threaded opening 47 such that the valve stem 18 may be screwed down the rod 27 to contact with the nut 32 to securely mount the valve plug 16 to the lower end of the valve stem 18. In this manner, the valve plug 16 may be moved through a controlled axial displacement within the restrictor 15, by the valve stem 18, as discussed above. Upon the seating of the valve plug 16 onto the valve seat 20, the actuator (not specifically illustrated, see pages 8-9) will operate to apply additional downward pressure on the valve stem 18 which pressure will be transmitted through the nut 32 to the compressing element 26. The downward pressure of the compressing element 26 will compress the seal forming member 25 between the compressing element 26 and the now seated main valve plug 24.

Referring now to FIG. 5, the compression on the seal forming member 25 will result in a further crimping of the wall sections 36, 37 by the angled surfaces 31, 42 of the compressing element 26 and main valve plug 24. This will cause the packing material 41 to be further, more tightly compressed against the spherical surfaces 38, 39 and the straightlined section 40. Pursuant to the invention, it has been discovered that at a certain, predetermined amount of compression, the outward forces exerted by the packing material 41, due to the additional crimping, will begin to deform the thin section 40 into an outwardly extending bulge a-b-a (FIG. 5). The unequal angles of inclination 45, 46 cause a more pronounced crimping of the upper wall section 36 resulting in the greatest outward force of the packing material and therefore the bulge a-b-a formation to be oriented (the b point) toward the upper portions of the straightlined section 40. Moreover, the proximity between the point b and crimping force of the surface 42 provides for a more concentrated force application by the packing material 41 to the bulge a-b-a. The illustration of FIG. 5 is exaggerated to more clearly display the additional crimping and bulge formation that occurs during compression of the seal forming member 25.

As clearly illustrated in FIGS. 1 and 3, the outer surfaces of the seal-forming member 25 and the main valve plug 24 form a generally smooth continuation of one another and the valve plug 16 itself is closely received within the restrictor 15. Accordingly, the bulge formation a-b-a will contact the inner surfaces of the restrictor 15, with the outward forces exerted by the packing material 41 causing an extremely tight fit between the seal forming member 25 and the restrictor 15 around the full 360° of the bulge formation a-b-a. During empirical testing of a prototype of the invention, it has been found that the seal formed by the bulge a-b-a is as effective as the seal between the valve plug 16 and valve seat 20. It has also been found that the compression on and asymmetrical crimping of the wall sections 36, 37, together with the generally continuous contact between the wall section 37 and surface 31, results in a seal forming tight contact between the wall section 37 and the surface 31. This additional seal will prevent any seepage that may occur between the seal forming member 25 and the upper section 30 of the main valve plug from bypassing the bulge a-b-a seal. Yet, to advantage, the presence of fluid pressure up to the point of the additional seal formation tends to compensate for area unbalances of the plug to further balance the pressure effects upon the valve plug.

Upon a valve opening operation, the valve stem 18 operates to lift the valve plug 16 from the valve seat 21 and thereby removes the compressive pressure from the axial stack comprising the plug 16. Pursuant to the invention, the amount of additional crimping and the bulge formation are held to within the resiliency of the material forming the doughnut-shaped element 34, e.g., stainless steel. Accordingly, the removal of the compression allows the resiliency of the wall sections 36, 37 to resume the orientation of FIG. 4 and thereby removes the additional forces on the packing material 41. This, in turn, results in the subsiding of the bulge formation a-b-a, also within the resiliency of the material forming the element 34, until the outer cylindrical wall 35 resumes the characteristic of a generally smooth surface (see FIG. 4).

The present invention, therefore, provides an extremely effective and practical valve plug configuration which is ideal for use in high pressure and high temperature applications. The seal forming member of the invention may comprise a tough, durable material, such as stainless steel or teflon to improve the sealing contact and extend the work life of the valve plug. Significantly, the use of a durable material to form the actual seal provides a seal that is highly resistant to wear due to the high temperature and high pressure of the fluid flow to be controlled. The seal itself is actively formed due to an outwardly directed pressure continuously exerted during valve shut off via the actuator to provide an extremely tight fit between the plug and valve housing components. Indeed, the sealing effectiveness of the bulge formation has proven to be as effective as the primary valve plug-valve seat shut off. During all times of valve operation other than at shut off, the seal forming member 25 forms a smooth continuation of the outer surface of the main valve plug 24 to facilitate ease of valve operation with minimal friction on the working surfaces of the seal forming component 25 of the valve plug 16. Moreover, the additional specific features of the preferred embodiment of the invention, such as the asymmetrical crimping and straightlined section of minimum thickness, have been found to provide improved and optimum operation of the invention including a maximization of the outward forces exerted by the bulge and the formation of the additional seal barrier between the member 25 and upper surface 31 of the main valve plug 24. The present invention affords a maximum seal effectiveness that is durable and able to withstand the deleterious effects of a high temperature and high pressure fluid environment and with a mode of operation that is a low friction-wear operation.

It should be understood, of course, that the specific form of the invention herein illustrated and described is intended to be representative only, as certain changes may be made therein without departing from the clear teachings of the disclosure. Accordingly, reference should be made to the following appended claims in determining the full scope of the invention.

I claim:

1. A valve plug for use in a fluid control valve, which comprises:
   (a) a main valve plug member,
   (b) a seal forming member mounted in an axially stacked relation to said main valve plug member whereby said seal forming member and said main valve plug member together form a generally smooth, continuous outer surface,
   (c) said seal forming member comprising
      (i) an outer element made from a durable material having predetermined resilient characteristics and including an outer wall member forming said generally smooth continuous outer surface with said main valve plug and two, spaced wall sections, each being connected at a first end to said outer wall member and having a second free end,
      (ii) the connected ends of said two wall sections and said outer wall member being arranged and configured with respect to one another whereby there is a section of minimum wall thickness arranged within said outer wall member at a position between said spaced, two wall sections,
      (iii) said outer wall member and said two, spaced wall sections defining an interior space within said outer element,
      (iv) a packing material tightly received and compressed within said interior space of the outer element, and
   (d) means for compressing said seal forming member upon shut off of the control valve whereby the free ends of the two wall sections are resiliently crimped toward one another to compress and urge the packing material toward the section of minimum thickness of the outer wall to resiliently deform said outer wall into an outwardly extending bulge formation, which bulge formation is arranged to contact said control valve to thereby form a leak tight seal around the valve plug.

2. The valve plug according to claim 1, further characterized by,
   (a) said means for compressing said seal forming member comprising a compressing element arranged in a close, axially stacked relation to said seal forming member, and
   (b) valve actuator means operative to apply pressure to said compressing element upon valve shut off whereby said compressing element acts to compress the two wall sections of said seal forming member between the compressing element and said main valve plug member.

3. The valve plug according to claim 2, further characterized by,
   (a) said compressing element having a bottom, angled surface confronting one of said wall sections of the seal forming member, and
   (b) said main valve plug member having a top, angled surface confronting the other wall section of said seal forming member.

4. The valve plug according to claim 3, further characterized by said bottom angled surface of said compressing element having an angle of inclination that is greater than the angle of inclination of the top, angled surface of the main valve plug member.

5. The valve plug according to claim 3, further characterized by,
   (a) said spaced wall sections each being of an annular shape,
   (b) said bottom angled surface of said compressing element contacting said one of said wall sections in a limited area proximate to the innermost diameter thereof, and
   (c) said top angled surface of said main valve plug member contacting said other wall section generally throughout the width of said other wall section.

6. The valve plug according to claim 5, further characterized by,
   (a) said main valve plug member, said seal forming member and said compressing element being arranged in that order in an axial stack,
   (b) a threaded rod element being received through the center line of said axial stack and including a stop end engaging the bottom of said main valve plug member, and
   (c) a nut threadedly received onto said threaded rod and positioned to contact said compressing element and secure said main valve plug member, said seal forming member and said compressing element in a close, axial stack between said nut and said stop end.

7. The valve plug according to claim 1, further characterized by said outer wall member being cylindrical and said two wall sections each being of an annular shape and extending radially inward, one from the top and one from the bottom of said outer wall member to define a doughnut-shaped configuration for said outer element.

8. The valve plug according to claim 7, further characterized by the connected first ends of said wall sections and said outer wall member defining a generally U-shaped cross-section within said interior space.

9. The valve plug according to claim 8, further characterized by,
   (a) said generally U-shaped cross-section comprising a spherical surface formed within said interior space between each of said wall sections and said outer wall member and a straightlined section formed within said outer wall member at a position midway between said wall sections,
   (b) said straightlined section comprising said section of minimum wall thickness and,
   (c) the radii of the spherical surfaces being equal to one another.

10. The valve plug according to claim 9, further characterized by the free ends of said wall sections being permanently crimped by a first predetermined amount toward one another and being further resiliently crimped by said compressing means by a second predetermined amount, upon valve shut off, to compress said packing material.

11. A valve plug for use in a fluid valve, which comprises:
   (a) a main valve plug member,
   (b) a seal forming member associated with said main valve plug and axially aligned therewith,
   (c) said seal forming member including an outer wall having a surface that is coincident with an imaginary surface extension of the outer surface of the main valve plug and integral upper and lower radially extending wall sections connected to said outer wall,
   (d) said seal forming member comprising a durable material having predetermined resilient characteristics, whereby said upper and lower wall sections of said seal forming member is are resiliently compressible toward one another within a predetermined range of compression,
   (e) said seal forming member including an interior space defined by said outer wall and said upper and lower wall sections and a finite section of minimum wall thickness formed in said outer wall,
   (f) a packing material tightly received and compressed within said interior space and,
   (g) means for compressing said seal forming member upon valve shut off, (whereby) to compress said upper and lower wall sections of said seal forming member (is) resiliently (compressed) within said predetermined range of compression toward one another to thereby compress and urge said packing material toward said finite section of minimum wall thickness of the outer wall to resiliently deform said outer wall into an outwardly extending bulge formation, which bulge formation is arranged to contact said control valve to thereby form a leak tight seal around the valve plug.

* * * * *